United States Patent
Hooker et al.

(10) Patent No.: US 11,506,540 B2
(45) Date of Patent: Nov. 22, 2022

(54) CALIBRATION OF A THERMAL IMAGING DEVICE FOR A SURFACE COOKING APPLIANCE

(71) Applicant: Midea Group Co., Ltd., Foshan (CN)

(72) Inventors: John Kenneth Hooker, Louisville, KY (US); Dane Andrew Copple, New Albany, IN (US)

(73) Assignee: MIDEA GROUP CO., LTD., Guangdong (CN)

( * ) Notice: Subject to any disclaimer, the term of this patent is extended or adjusted under 35 U.S.C. 154(b) by 924 days.

(21) Appl. No.: 16/352,098

(22) Filed: Mar. 13, 2019

(65) Prior Publication Data

US 2020/0292392 A1 Sep. 17, 2020

(51) Int. Cl.
*G01J 5/80* (2022.01)
*F24C 7/08* (2006.01)
(Continued)

(52) U.S. Cl.
CPC ............... *G01J 5/80* (2022.01); *F24C 7/083* (2013.01); *G01J 5/03* (2022.01); *G01J 5/53* (2022.01);
(Continued)

(58) Field of Classification Search
CPC combination set(s) only.
See application file for complete search history.

(56) References Cited

U.S. PATENT DOCUMENTS 8,931,400 B1* 1/2015 Allen ............... G01K 1/024
99/344
9,109,805 B2 8/2015 Bach
(Continued)

FOREIGN PATENT DOCUMENTS

CN 107990383 A 5/2018
GB 2564657 A 1/2019
(Continued)

OTHER PUBLICATIONS

Thermador, Sensor Cooking: New Induction and Electric Cooktops, BSH Home Appliances Corporation, 2009.
(Continued)

*Primary Examiner* — Lisa M Caputo
*Assistant Examiner* — Nasir U. Ahmed
(74) *Attorney, Agent, or Firm* — Middleton Reutlinger

(57) ABSTRACT

A thermal imaging system for a cooking appliance is capable of being calibrated for any arrangement of cooktop burners disposed on a surface of a cooking appliance. A thermal imaging system can be calibrated by processing a received thermal scan of a surface of a cooking appliance having a particular cooktop arrangement to identify a plurality of cooktop burners on the surface of the cooking appliance for the particular arrangement, determine a number of cooktop burners in the particular arrangement, and determine one or more locations of the cooktop to assign to each of the cooktop burners. Further, the determined one or more locations assigned to each of the cooktop burners can be stored in association with a respective cooktop burner. Once calibrated, the thermal imaging system can calculate a temperature for each of the cooktop burners to be used in performing subsequent control and/or safety functions.

22 Claims, 5 Drawing Sheets

(51) Int. Cl.
    *G01J 5/53*          (2022.01)
    *G01J 5/03*          (2022.01)
    *G01J 5/00*          (2022.01)
    *H05B 6/06*         (2006.01)
    *G01J 5/48*          (2022.01)

(52) U.S. Cl.
    CPC ....... *G01J 5/485* (2022.01); *G01J 2005/0077* (2013.01); *H05B 6/062* (2013.01)

(56) References Cited

U.S. PATENT DOCUMENTS

| | | | |
|---|---|---|---|
| 10,085,585 B2 | 10/2018 | Siegel et al. | |
| 2012/0111852 A1* | 5/2012 | Bach | H05B 1/0266 219/448.11 |
| 2015/0196161 A1* | 7/2015 | Myllymaki | G05B 13/0265 700/90 |
| 2017/0138797 A1* | 5/2017 | Brown | G01K 1/14 |
| 2017/0198920 A1 | 7/2017 | Golomb | |
| 2017/0367151 A1* | 12/2017 | Rafii | H05B 6/1218 |
| 2017/0370775 A1 | 12/2017 | Kusukame et al. | |
| 2018/0224127 A1* | 8/2018 | Lambert | H05B 1/0266 |
| 2018/0253953 A1 | 9/2018 | Bucsa et al. | |
| 2018/0372332 A1* | 12/2018 | Cha | F24C 15/2042 |
| 2019/0114935 A1* | 4/2019 | Nolan | F24C 15/2064 |
| 2019/0223260 A1* | 7/2019 | Takagi | H05B 6/1218 |

FOREIGN PATENT DOCUMENTS

| | | |
|---|---|---|
| JP | 2010014342 A | 1/2010 |
| KR | 20160073464 A | 6/2016 |
| TW | M540245 U | 4/2017 |

OTHER PUBLICATIONS

Lasobras, Javier et al., Infrared Sensor-Based Temperature Control for Domestic Induction Cooktops, Sensors Journal, vol. 14 Issue 3, www.mdpi.com, Mar. 14, 2014.

International Search Report and Written Opinion issued in Application No. PCT/CN2019/093692 dated Dec. 25, 2019.

* cited by examiner

CALIBRATION OF A THERMAL IMAGING DEVICE FOR A SURFACE COOKING APPLIANCE

BACKGROUND

Cooktops, whether as standalone cooking appliances or incorporated into other cooking appliances such as ranges, generally incorporate multiple heating elements, generally referred to as burners, which are generally controlled by individual burner controls. Cooktop burners may be heated using various types of technologies, e.g., using gas, resistive electrical elements or inductive electrical elements, and while in some instances the cooktop burners may incorporate surfaces upon which pots and pans may be directly placed, in other instances the cooktop burners may be covered with grates or may be disposed below glass surfaces upon which pots and pans may be placed.

Given the standard depth of many countertops as well as the typical size of the pots and pans conventionally used with cooktops, the cooktops of many cooking appliances incorporate 4, 5 or 6 burners arranged in a two-dimensional array. The cooktop burners may also vary from one another in size and/or output capacity to accommodate different cooking needs.

It has been proposed to use a thermal imaging device in connection with a cooktop for control and/or safety reasons, e.g., to detect when a cooktop burner is active but unattended. Many thermal imaging devices operate similar to digital cameras, but are tuned to capture infrared radiation rather than radiation in the visible spectrum. As a result, these devices typically generate "images" representing the intensity of infrared radiation at different locations within the fields of view of such devices. These intensity values may be correlated with temperature, and as such, a thermal scan generally includes a two dimensional array of "pixels" that each represent a measured temperature at a particular location in the field of view depicted in the thermal scan.

One logical placement location of such a thermal imaging device would be above the cooktop, e.g., either attached to a range hood located directly above the cooktop or attached to an underside of a separate appliance located directly above the cooktop (e.g., an over-the-range microwave oven). Generally, however, the number of burners, the size of each burner, and the location of each burner can vary from cooktop-to-cooktop. Moreover, the height from a cooktop surface to a range hood located directly above the cooktop or the underside of a separate appliance located directly above the cooktop is not standard, and can vary from installation to installation. Use of a thermal scan of a cooktop for control and/or safety reasons, however, generally requires some understanding of the number, size, and locations of the burners within the thermal scan, as a cooktop can be a highly dynamic environment when in use, as some burners may be on, some burners may be off, pots or pans may be placed on some or all of the burners, a cook may be interacting with the cooktop, etc. As such, interpreting a thermal scan captured by a thermal imaging device in such an environment would be difficult without some understanding of the configuration of the cooktop within the thermal scans captured by that thermal imaging device.

SUMMARY

The herein-described embodiments address these and other problems associated with the art by providing methods and systems for calibrating a thermal imaging device for a surface cooking appliance that is capable of identifying a particular arrangement of the cooktop burners (e.g., one or more of a number of cooktop burners, a location of each of the cooktop burners, a size of each of the cooktop burners, etc.), and storing data for the identified particular arrangement of the cooktop burners. Further, once calibrated, the thermal imaging device can be used to monitor each of the cooktop burners when active and enable a controller of the surface cooking appliance to perform control and/or safety functions with respect to each of the cooktop burners in the particular arrangement.

Therefore, consistent with one aspect of the invention, a method for calibrating a thermal imaging device for a surface cooking appliance including a plurality of cooktop burners is provided. The method includes receiving, by one or more processors and from the thermal imaging device, a first thermal scan of the surface cooking appliance captured while the plurality of cooktop burners are active. The first thermal scan includes a plurality of data values, and each of the data values are associated with a temperature at an associated location among a plurality of locations in a field of view of the thermal imaging device. The method further includes processing, by one or more of the processors, the plurality of data values of the first thermal scan of the surface cooking appliance to: identify each of the plurality of cooktop burners of the surface cooking appliance, determine therefrom a number of cooktop burners in the plurality of cooktop burners, and determine therefrom one or more locations from among the plurality of locations in the field of view of the thermal imaging device to assign to each cooktop burner. The method further includes storing, by one or more of the processors, the determined one or more locations for each of the plurality of cooktop burners for subsequent calculation of a temperature for each of the plurality of cooktop burners from an additional thermal scan captured during operation of the surface cooking appliance.

In addition, in some embodiments, processing the plurality of data values of the first thermal scan of the surface cooking appliance can include generating a two dimensional array of pixels, where each pixel in the array of pixels corresponds to a location among the plurality of locations in the field of view of the thermal imaging device and has a value determined based on the data value for the corresponding location. Further, in some embodiments, the method can include scanning the array of pixels to identify each of the cooktop burners of the surface cooking appliance.

Moreover, in some of those embodiments, generating the array of pixels can include marking each pixel in the array of pixels for which the data value in the thermal scan for the corresponding location meets a threshold. Further, in some of those embodiments, scanning the array of pixels can include scanning through the array of pixels to determine a span for each cooktop burner in each of first and second dimensions based upon which pixels are marked.

In addition, in some further embodiments, scanning the array of pixels can include scanning through the array of pixels to determine a span for a first cooktop burner among the plurality of cooktop burners in each of the first and second dimensions, thereafter clearing a plurality of pixels corresponding to the first cooktop burner, and thereafter scanning through the array of pixels to determine a span for a second cooktop burner among the plurality of cooktop burners in each of the first and second dimensions.

Also, in some of those further embodiments, determining one or more locations from among the plurality of locations in the field of view of the thermal imaging device to assign to each cooktop burner can include, for a first cooktop burner among the plurality of cooktop burners, determining a single center location to assign to the first cooktop burner using the determined spans for the first cooktop burner in the first and second dimensions.

In addition, in some other of those further embodiments, determining one or more locations from among the plurality of locations in the field of view of the thermal imaging device to assign to each cooktop burner can include, for a first cooktop burner among the plurality of cooktop burners, determining a plurality of center locations to assign to the first cooktop burner using the determined spans for the first cooktop burner in the first and second dimensions.

In addition, in some other of those further embodiments, determining one or more locations from among the plurality of locations in the field of view of the thermal imaging device to assign to each cooktop burner can include, for a first cooktop burner among the plurality of cooktop burners, determining a plurality of internal locations to assign to the first cooktop burner using the determined spans for the first cooktop burner in the first and second dimensions.

In some embodiments, the method can further include receiving, by one or more of the processors and from the thermal imaging device, a second thermal scan captured during operation of the surface cooking appliance, retrieving the stored one or more locations for a first cooktop burner among the plurality of cooktop burners, and determining, by one or more of the processors, a temperature for the first cooktop burner using at least one data value from the second thermal scan that is associated with the retrieved one or locations for the first cooktop burner.

Moreover, in some of those embodiments, determining the temperature for the first cooktop burner can include determining the temperature using a single center location for the first cooktop burner. Further, in some other of those embodiments, determining the temperature for the first cooktop burner can include determining the temperature using a plurality of center locations for the first cooktop burner. Even further, in some other of those embodiments, determining the temperature for the first cooktop burner can include determining the temperature using a plurality of internal locations for the first cooktop burner.

Also, in some further embodiments the method can further include regulating an energy output of the first cooktop burner based upon the determined temperature for the first cooktop burner. Further, in some other of those embodiments, the method can further include detecting an occurrence of a safety event for the first cooktop burner based upon the determined temperature for the first cooktop burner, and subsequent to detecting the occurrence of the safety event, automatically turning off the first cooktop burner and/or providing an audible and/or visual alert of the safety event, where the safety event can be a boil-dry event or a boil-over event.

In addition, in some embodiments, the method can further include, prior to receiving the first thermal scan of the surface cooking appliance from the thermal imaging device, receiving, by one or more of the processors, an indication to initiate calibration of the thermal imaging device. In those embodiments, the indication to initiate calibration of the thermal imaging device is received from at least one of: a user device via one or more networks, a user control of the surface cooking appliance, a user control of an additional cooking appliance in communication with the surface cooking appliance, or the thermal imaging device upon installation.

Moreover, in some embodiments, the thermal imaging device can be mounted above the surface cooking appliance, and wherein the surface cooking appliance is in the field of view of the thermal imaging device.

Consistent with another aspect of the invention, a system for calibrating a thermal imaging device for a surface cooking appliance including a plurality of cooktop burners is provided. The system includes one or more processors, and memory storing instructions that, when executed, the instructions cause one or more of the processors to receive, from the thermal imaging device, a first thermal scan of the surface cooking appliance captured while the plurality of cooktop burners are active. The first thermal scan includes a plurality of data values, where each of the data values associated with a temperature at an associated location among a plurality of locations in a field of view of the thermal imaging device. The instructions further cause one or more of the processors to process the plurality of data values of the first thermal scan of the surface cooking appliance to: identify each of the plurality of cooktop burners of the surface cooking appliance, determine therefrom a number of cooktop burners in the plurality of cooktop burners, and determine therefrom one or more locations from among the plurality of locations in the field of view of the thermal imaging device to assign to each cooktop burner. The instructions further cause one or more of the processors to store the determined one or more locations for each of the plurality of cooktop burners for subsequent calculation of a temperature for each of the plurality of cooktop burners from an additional thermal scan captured during operation of the surface cooking appliance.

In some embodiments, the surface cooking appliance can be in the field of view of the thermal imaging device. In some of those embodiments, the thermal imaging device can be one of: incorporated into a housing of an over-the-range oven disposed above the surface cooking appliance, mounted to an underside of the housing of the over-the-range oven disposed above the surface cooking appliance, mounted to an underside of an additional cooking appliance disposed above the surface cooking appliance, or mounted to a side of a vent hood disposed above the surface cooking appliance.

Moreover, in some embodiments, the instructions are executed by the one or more processors of: a controller of the surface cooking appliance in communication with the thermal imaging device, the thermal imaging device in communication with the surface cooking appliance, a user device in communication with both the thermal imaging device and the surface cooking appliance, or an additional computing device in communication with both the thermal imaging device and the surface cooking appliance.

In addition, in some embodiments, the thermal imaging device includes an array of thermal sensors configured to detect at least one of: infrared waves, far infrared waves, and long wave infrared.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
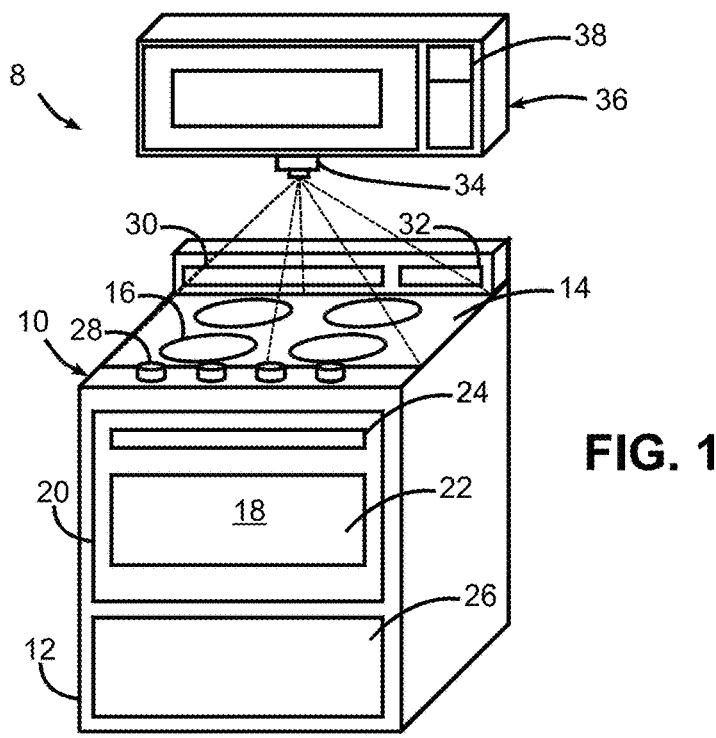
FIG. 1 is a perspective view of a cooking appliance consistent with some embodiments of the invention.

Turning now to the drawings, wherein like numbers denote like parts throughout the several views, FIG. 1 illustrates an example cooking appliance 8 in which the various technologies and techniques described herein may be implemented. Cooking appliance 8 in this embodiment includes multiple components or appliances, including a range 10 and an over-the-range oven 36.

Range 10 includes a housing 12, a stovetop or cooktop 14 including a plurality of cooktop burners 16, and an oven 18 defining a cooking cavity accessed via an oven door 20 having a window 22 and a handle 24. Range 10 may also include a storage drawer 26 in some embodiments, or in other embodiments, may include a second oven. Various cooking elements (not shown in FIG. 1) may also be incorporated into range 10 for cooking food in oven 18, e.g., one or more electric or gas heating elements.

Range 10 may also include various user interface devices, including, for example, control knobs 28 for controlling cooktop burners 16, a control panel 30 for controlling oven 18 and/or cooktop burners 16, and a display 32 for providing visual feedback as to the activation state of the cooking appliance. It will be appreciated that range 10 may include various types of user controls in other embodiments, including various combinations of switches, buttons, knobs and/or sliders, typically disposed at the rear or front (or both) of the cooking appliance, although in some instances, user controls may be disposed at different locations, e.g., along the side of a cooking appliance or grouped near the center of a cooking appliance. Further, in some embodiments, one or more touch or proximity sensitive surfaces may be employed for interaction with a user. As such, in some embodiments, display 32 may be touch sensitive to receive user input in addition to displaying status information and/or otherwise interacting with a user. In still other embodiments, range 10 may be controllable remotely, e.g., via a smartphone, tablet, personal digital assistant, desktop computer, laptop or other networked computing device, e.g., using a web interface or a dedicated app.

Display 32 may also vary in different embodiments, and may include individual indicators, segmented alphanumeric displays, and/or dot matrix displays, and may be based on various types of display technologies, including but not limited to LEDs, vacuum fluorescent displays, liquid crystal displays, etc. Further, in some embodiments audio feedback may be provided to a user via one or more speakers, and in some embodiments, user input may be received via a spoken or gesture-based interface.

As noted above, range 10 combines both a cooktop and one or more ovens, and in some embodiments may be a standalone or drop-in type of range. In other embodiments, however, range 10 may be another type of cooking appliance, e.g., a drop-in cooktop (as discussed in greater detail below in connection with FIG. 4).

Figure 3:
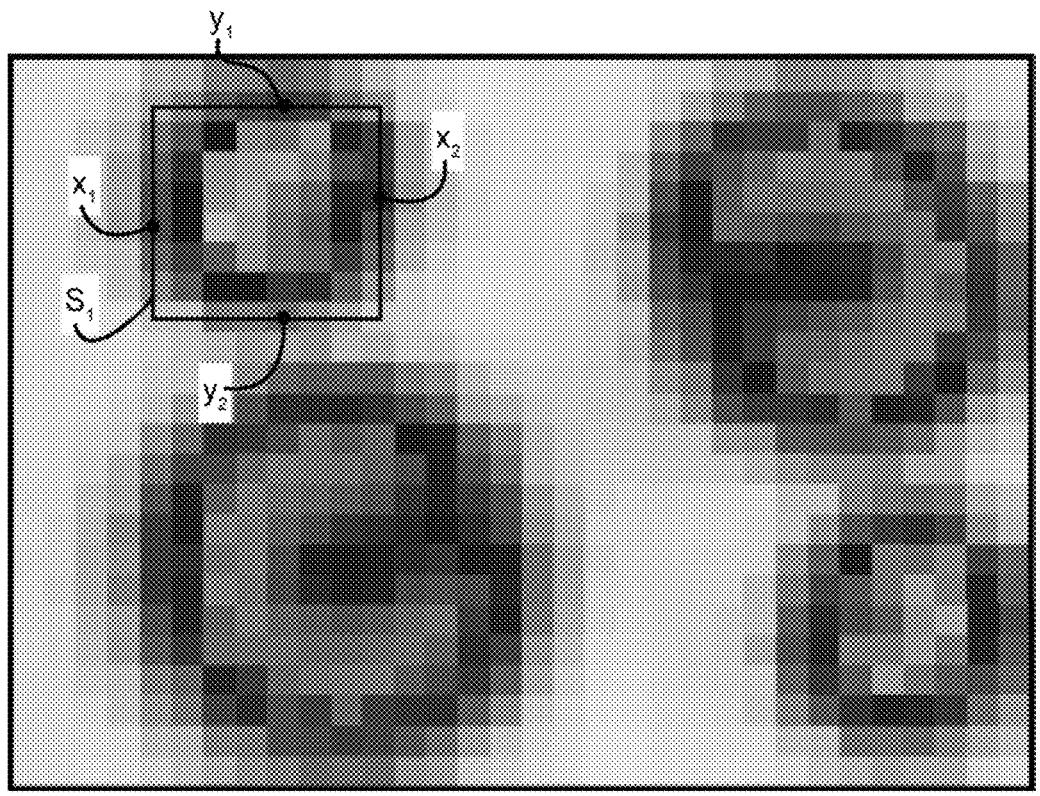
FIG. 3 illustrates an example thermal scan from a thermal imaging system consistent with the invention.

In addition, consistent with the invention cooking appliance 8 includes a thermal imaging system, e.g., thermal imaging system 34 (also referred to as "thermal imaging device"), which is disposed above cooktop burners 16, e.g., on an underside of over-the-range oven 36, to capture a thermal scan of the cooktop burners 16 included in a field of view of the thermal imaging system 34. Thermal imaging system 34 may include an array of thermal sensors capable of detecting various infrared wavelengths, e.g., infrared waves, far-infrared waves, long wave infrared waves. A field of view of thermal imaging system 34 (as indicated by dashed lines in FIG. 1) may be based on a field of view angle (e.g., 55°, 110°, etc.) of the thermal imaging system 34 and a height from the cooktop 14 to the thermal imaging system 34. An example thermal scan including a 32×24 array of data values and for an example cooking appliance with all burners activated is illustrated in FIG. 3.

In some embodiments, it may be desirable to have thermal imaging system 34 with a 110° field of view angle, while in other embodiments it may be desirable to have a thermal imaging system 34 with a 55° field of view angle. For example, a typical height from a floor to cooktop 14 is between 30-inches and 36-inches, a typical width of cooktop is also between 30-inches and 36-inches, and a typical height from cooktop 14 to an underside of over-the-range oven 36 or a vent hood is between 14-inches and 30-inches. Moreover, a field of view for a thermal imaging system 34 can vary based on whether the thermal imaging system 34 is mounted 14-inches above cooktop 14 or 30-inches above cooktop 14. Despite these variations, thermal imaging system 34 can be calibrated for any arrangement of cooktop burners 16 with either field of view angle, but the resolution of a thermal scan capture by thermal imaging system 34 can vary based on the field of view angle.

In this embodiment, thermal imaging system 34 is powered by and in communication with range 10 via one or more wires (not shown in FIG. 1), although it will be appreciated that in other embodiments, a thermal imaging system may be powered by an overhead appliance (e.g., microwave, oven or vent hood), or may be separately powered. Further, in other embodiments, a thermal imaging system may be in communication with range 10 via one or more wireless networks such as Wi-Fi, Bluetooth, NFC, cellular and other suitable networks.

Oven 36 may be a microwave oven including a control panel 38, and may also include in some embodiments a light for illuminating the surface of the countertop and/or an exhaust vent for venting cooking odors, heat, smoke, grease and/or moisture. Other types of ovens, e.g., conventional, speed cook or convection ovens, may be used in other embodiments, while in other embodiments, a vent hood may be disposed over range 10 instead of an oven (as discussed in greater detail below in connection with FIG. 4), and in still other embodiments, cabinets may be disposed over range 10 or the area over the range may be otherwise open, with the thermal imaging system 34 incorporated into or otherwise mounted to a structure such that the cooktop is viewable by the thermal imaging system. For example, thermal imaging system can be incorporated into a housing of over-the-range oven 36.

In general, a cooking appliance consistent with the invention may be considered to include any residential-type appliance (or combination of appliances), and disposed within one or more housings. It will be appreciated that for some types of built-in appliances may have exposed portions that are hidden from view when installed, and as such, a housing consistent with the invention may also be considered to include structural and frame members in some embodiments. At least one appliance in a cooking appliance consistent with the invention may include one or more cooktop burners and one or more burner controls configured to control a respective cooktop burner among the one or more cooktop burners. A cooktop burner may be considered to include practically any type of energy-producing heating element used in residential applications in connection with cooking food on a cooktop, e.g., employing various cooking technologies such as electric, induction, gas, etc. Further, it will be appreciated that any number of cooktop burners may be provided in a cooking appliance, and that multiple types of cooktop burners may be combined in some embodiments, e.g., combinations of gas and electric burners in some embodiments, as well as different form factors, e.g., griddles, grills, etc. A burner control, in turn, may be considered to include practically any type of user control suitable for controlling a specific cooktop burner, including, for example, a knob, a slider, a touchscreen or touch-sensitive surface, one or more buttons, etc.

Figure 2:
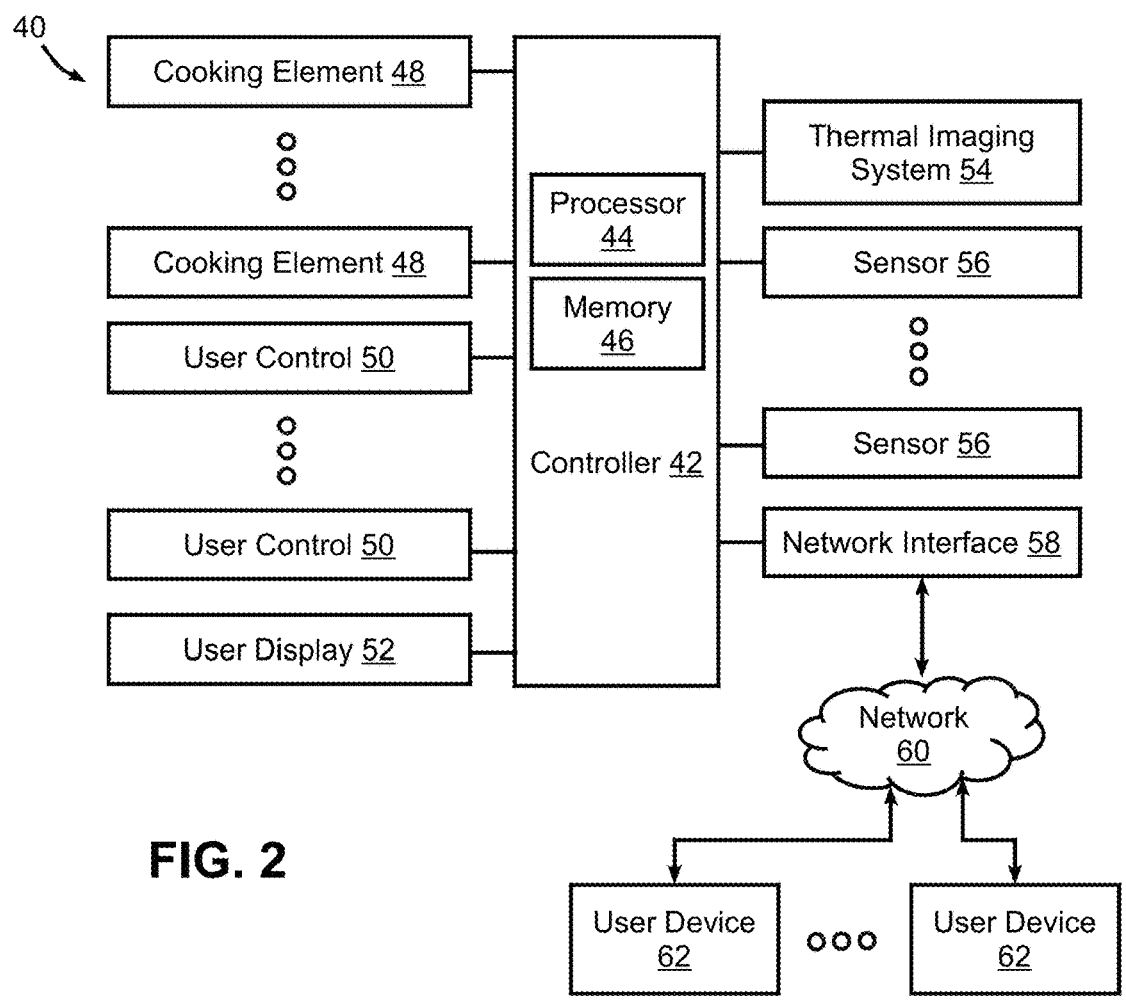
FIG. 2 is a block diagram of an example control system for a cooking appliance consistent with some embodiments of the invention.

A cooking appliance consistent with the invention also generally includes one or more controllers configured to control the cooktop burners and other cooking elements, and otherwise perform cooking operations at the direction of a user. FIG. 2, for example, illustrates an example embodiment of a control system for a cooking appliance 40 including a controller 42 that receives inputs from a number of components and drives a number of components in response thereto. Controller 42 may, for example, include one or more processors 44 and a memory 46 within which may be stored program code for execution by the one or more processors. The memory may be embedded in controller 42, but may also be considered to include volatile and/or non-volatile memories, cache memories, flash memories, programmable read-only memories, read-only memories, etc., as well as memory storage physically located elsewhere from controller 42, e.g., in a mass storage device or on a remote computer interfaced with controller 42.

As shown in FIG. 2, controller 42 may be interfaced with various components, including various cooking elements 48 used for cooking food (e.g., various combinations of gas, electric, inductive, light, microwave, light cooking elements, among others, including one or more cooktop burners), one or more user controls 50 for receiving user input (e.g., various combinations of switches, knobs, buttons, sliders, touchscreens or touch-sensitive displays, microphones or audio input devices, image capture devices, etc., including one or more burner controls), and a user display 52 (including various indicators, graphical displays, textual displays, speakers, etc.), as well as various additional components suitable for use in a cooking appliance, e.g., lights, fans, indicators, switches, valves, etc., among others.

In addition, controller 42 may be interfaced with an thermal imaging system 54 configured to capture a thermal scan of a cooktop, including one or more cooktop burners, using an array of thermal sensors, as will be discussed in greater detail below. Controller 42 may also be interfaced with various additional sensors 56 located to sense environmental conditions inside of and/or external to cooking appliance 40, e.g., one or more temperature sensors, humidity sensors, air quality sensors, smoke sensors, carbon monoxide sensors, odor sensors and/or electronic nose sensors, among others. Such sensors may be internal or external to cooking appliance 40, and may be coupled wirelessly to controller 42 in some embodiments.

In some embodiments, controller 42 may also be coupled to one or more network interfaces 58, e.g., for interfacing with external devices via wired and/or wireless networks such as Ethernet, Wi-Fi, Bluetooth, NFC, optical, cellular and other suitable networks, collectively represented in FIG. 2 at 60. Network 60 may incorporate in some embodiments a home automation network, and various communication protocols may be supported, including various types of home automation communication protocols. Network 60 may also be used to communicate between different components in cooking appliance 40, e.g., between controller 42 and thermal imaging system 54, between controller 42 and one or more user controls 50, or even between multiple control modules of controller 42, e.g., in the instance where the functionality of controller 42 is distributed amongst multiple control modules disposed proximate a cooktop and proximate a thermal imaging system.

In some embodiments, cooking appliance 40 may also be interfaced with one or more user devices 62 over network 60, e.g., computers, laptops, tablets, smart phones, wearable devices, personal digital assistants, automated assistants, etc., and through which cooking appliance 40 may be controlled and/or cooking appliance 40 may provide user feedback.

In some embodiments, controller 42 may operate under the control of an operating system and may execute or otherwise rely upon various computer software applications, components, programs, objects, modules, data structures, etc. In addition, controller 42 may also incorporate hardware logic to implement some or all of the functionality disclosed herein. Further, in some embodiments, the sequences of operations performed by controller 42 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the cooking appliances illustrated in FIGS. 1-2 will be apparent to one of ordinary skill in the art, as will become apparent from the description below. Therefore, the invention is not limited to the specific implementations discussed herein.

Embodiments consistent with the invention, as mentioned above, are directed in part to calibrating an overhead thermal imaging system for a cooking appliance that is capable of capturing a thermal scan of a cooktop, including one or more cooktop burners, via an array of thermal sensors, identifying a particular arrangement of the cooktop burners (e.g., one or more of a number of cooktop burners, a location of each of the cooktop burners, a size of each of the cooktop burners, etc.), and storing the identified particular arrangement of the cooktop burners for use in performing subsequent control and/or safety functions.

As noted above, it is believed that incorporating thermal imaging systems with cooktops may present a problem in that cooktops have different arrangements of cooktop burners. For example, some cooktops may have 4, 5 or 6 cooktop burners arranged in different two-dimensional arrays. Moreover, each of the cooktop burners in the different arrangements may vary in size from cooktop-to-cooktop. In addition, due to variations in the structures overhead of a cooktop, it cannot be assured that a thermal imaging device mounted overhead of a cooktop would be mounted at the same height and/or position every time. For example, some vent hoods and over-the-range microwave ovens are mounted 36-inches above a cooktop, whereas others may be mounted 24-inches above a cooktop. It is therefore believed that without an understanding of the location and/or size of each cooktop burner on a cooktop, however, determining what locations within a thermal scan correspond to what cooktop burners, and thus, what locations should be monitored for control and/or safety functions, can present challenges to implementation of such functions. Furthermore, while it would be conceivably possible to provide a thermal imaging system that can be repositioned, zoomed, or otherwise manipulated to alter the field of view of the thermal imaging system, doing so would potentially present additional burdens during installation of a cooking appliance.

Calibrating an overhead thermal imaging system for a particular cooktop arrangement as described herein, on the other hand, may enable the thermal imaging system to be adapted for any cooktop regardless of the number of cooktop burners are on a surface of the cooktop, what size they are, or how high above the cooktop the thermal imaging system is mounted. Further, in some embodiments, once initially calibrated, the thermal imaging system can be used to monitor operation(s) of the cooktop burners whether they are attended or unattended. Optionally, information related to the monitoring, and any alerts or notifications resulting from the monitoring, may be provided to a user via an interface of a cooking appliance or a user interface of a computing device associated with the user. The information, alerts, and/or notifications may be presented audibly and/or visually.

Referring back to FIG. 2, controller 42, by the processors 44, can receive an indication to initiate calibration of a thermal imaging system 54. The indication to initiate calibration of the thermal imaging device 54 may be received from a user device 62 over one or more networks 60, a user control 50 of the cooking appliance 40, a user control 50 of an additional cooking appliance in communication with the cooking appliance 40 (such as over-the-range oven 36 in FIG. 1), or the thermal imaging system 54 itself upon installation.

In response to receiving the indication to initiate calibration, the controller 42 can determine whether cooking elements 48 are active, where each cooking element 48 is associated with a corresponding cooktop burner. Further, once it is determined that each of the cooktop burners are active, the thermal imaging system 54 may capture a thermal scan of the cooking appliance and provide the thermal scan to the controller 42 for processing. The thermal scan includes a plurality of data values (i.e., intensity values, temperature values, RGB values, etc.) where each of the data values are associated with a temperature at an associated location among a plurality of locations in a field of view of the thermal imaging system 54. Additionally and/or alternatively, during calibration, the thermal imaging system can capture multiple scans of the cooktop surface, average the data values across the multiple scans, and provide the average data values to the controller 42. Moreover, the data values can be stored as a data value array locally on a memory thermal imaging system 54 and/or on the memory 46 of the controller 42.

The controller 42 can process, by the processors 44, the data values at each of the plurality of locations in the field of view of the thermal sensing device 54 to generate a two-dimensional array of pixels that represents a surface of the cooking appliance 40. In some embodiments, each pixel in the array can represent a corresponding location in the field of view of the thermal sensing device. The data value in the thermal scan at each location can be compared to a threshold, and if the data value exceeds the threshold, the corresponding pixel in the array it can be labeled as a "hot" pixel and represented by a corresponding label or value (e.g., label "hot", binary value of "1"). Otherwise, if the data value fails to exceed the threshold, the corresponding pixel in the array can be labeled as a "cold" pixel and represented by a corresponding label or value (e.g., label "cold", assign binary value of "0"). In other embodiments, the data values can be represented in the generated two-dimensional array of pixels using the actual data values (e.g., 68° Fahrenheit, 145° Fahrenheit, values for each RGB channel, intensity values, etc.), or by other data that maintains some variability responsive to temperature variations sensed by the thermal imaging device.

The two-dimensional array of pixels can therefore be generated by mapping each of the data values to a corresponding location in the two-dimensional array of pixels and effectively using a threshold to assign pixels "hot" or "cold" values to distinguish between pixels that are and are not to be considered within the boundary of a burner. As such, it will be appreciated that a value selected for a threshold may control which locations positioned proximate the boundary of a particular burner will be treated as being within the boundary of a burner. Additionally and/or alternatively, in some embodiments, the controller 42 can process the thermal scan locations and their associated data values without generating the two-dimensional array of pixels that represents the surface of the cooking appliance 40 by processing the data value array directly.

Moreover, the controller 42 can scan, by the processors 44, the generated two-dimensional array of pixels (or alternatively a temperature or intensity value array captured by thermal imaging system 54) to identify a location of each cooktop burner on the surface of the cooking appliance 40. The controller 42 can then determine therefrom a number of cooktop burners on the surface of the cooking appliance 40 and one or more locations in the field of view of the thermal imaging system 54 to assign to each of the cooktop burners.

In some embodiments, scanning the generated two-dimensional array of pixels can be iterative, while in other embodiments, the scanning of the generated 2D pixel array can be done as a batch. In some embodiments, while scanning the generated two-dimensional array of pixels (or alternatively the data value array captured via an array of thermal sensors of the thermal imaging system 54), the controller 42 identifies which pixels have been labeled as a "hot" pixel or are represented by a corresponding binary value of "1" as corresponding to a particular cooktop burner, while in other embodiments, the controller 42 identifies which pixels have sensed temperature values that correspond to an active cooktop burner in view of an ambient temperature of the cooktop (e.g., 200° at an active cooktop burner compared to 95° for the ambient temperature of the cooktop adjacent the active cooktop burner).

The controller 42 can scan the generated two-dimensional array of pixels to identify a span for each of the cooktop burners in a first and second dimension. For example, the controller 42 can scan the generated two-dimensional array of pixels row-by-row to identify a beginning x-pixel and an ending x-pixel of a first row associated with a first cooktop burner. After the ending x-pixel of the first row associated with the first cooktop burner is identified, the controller 42 can proceed to scan a next row to identify a beginning x-pixel and an ending x-pixel of a second row associated with the first cooktop burner, and so on until each beginning x-pixel and ending x-pixel associated with the first cooktop burner is identified. In some embodiments, each beginning and ending pixel may be stored as the span for the burner in the x-direction, while in other embodiments, only a single starting and ending x value may be stored for the burner, e.g., by selecting the left-most (minimum) and right-most (maximum) x-values identified in the row-by-row scan of the pixel array. Continuing with the example, the controller 42 can also scan the generated two-dimensional array of pixels column-by-column to identify a beginning y-pixel and an ending y-pixel of a first column associated with the first cooktop burner. After the ending y-pixel of the first column associated with the first cooktop burner is identified, the controller 42 can proceed to scan a next column to identify a beginning y-pixel and an ending y-pixel of a second column associated with the first cooktop burner, and so on until each beginning y-pixel and ending y-pixel associated with the first cooktop burner is identified. Thus, similar to the span in the first dimension, the span in the second dimension for the first cooktop burner may be stored either by storing starting and ending y values for each column, or by storing a top-most (minimum) and bottom-most (maximum) y-values identified in the column-by-column scan of the pixel array. The spans in the first and second dimensions for the first cooktop burner effectively define a boundary for the burner, either a boundary that generally follows the actual perimeter of the burner (e.g., with a generally circular shape for most commonly-used burner designs, or a generally rectangular boundary box with a determined length and width.

Moreover, in some embodiments, after the span in the first and second dimensions for the first cooktop burner is determined, each pixel in the two dimensional array located within the span can be cleared. For example, the values for the identified pixels associated with the first cooktop burner, e.g., those pixels with a label "hot", binary value of "1", temperature value, intensity value, etc., can be cleared, e.g., change the label to "cold", change the binary value to "0", change the value to "0". The controller 42 can continue to scan the generated two-dimensional array of pixels (or alternatively the data value array captured via an array of thermal sensors of the thermal imaging system 54) to identify each of the remaining cooktop burners of the cooking appliance 40 in a similar fashion until each of the cooktop burners of the particular arrangement are identified, assigned locations, and stored in memory 46. Based on the identified cooktop burners, the controller 42 can also determine a number of cooktop burners disposed on a surface of the cooking appliance 40, e.g., 4, 5, or 6 cooktop burners. In other embodiments, rather than scanning for cooktop burners one at a time, the entire array of pixels may be scanned in a single pass (or using single row-by-row and column-by-column passes) to determine the spans of all of the cooktop burners collectively.

Referring briefly to FIG. 3, a top view of a thermal scan from a thermal imaging system, e.g., thermal imaging system 54 of FIG. 2, is illustrated. A two dimensional array of pixels generated from the thermal scan can be scanned to identify a first cooktop burner, e.g., a top-left cooktop burner in FIG. 3. For example, a rows can be scanned to identify left-most and right-most x-values (labeled $x_1$ and $x_2$ in FIG. 3) having associated data values that exceed a threshold. Similarly, columns can be scanned to identify top-most and bottom-most y-values (labeled $y_1$ and $y_2$ in FIG. 3) having associated data values that exceed the threshold, resulting in a rectangular span $S_1$ that spans between points $(x_1, y_1)$ and $(x_2, y_2)$.

After the first cooktop burner is identified and the span for the first cooktop burner is identified, the data values at the locations corresponding to first cooktop burner can be cleared to not interfere with identifying any remaining cooktop burners. Similar operations may be performed to identify remaining cooktop burners included from the generated two-dimensional array of pixels, e.g., a top-right cooktop burner, a bottom-left cooktop burner, and a bottom-right cooktop burners. Further, corresponding spans for each of these burners can be determined.

Referring back to FIG. 2, during calibration, the controller 42 can determine various locations (e.g., "single center location", "plurality of center locations", "internal locations") within each corresponding cooktop burner. These various locations enable different methods (e.g., "center only", "center plus", "all but edge") to be used for calculating a temperature for each cooktop in subsequent use of a calibrated thermal imaging system. Determining each of these various locations is discussed in greater detail below in connection with FIGS. 6A-6C. Once calibrated, the temperature of each cooktop burner can be determined according to one or more of these methods, and used in performing subsequent control and/or safety functions for each corresponding cooktop burner (i.e., increase or decrease energy output of a cooktop burners, shut off a cooktop burner, generate an alert related to a cooktop burner, etc.).

In some embodiments, during calibration, a user may select (via user control 50 or user device 62) one of these methods to be used for subsequent temperature calculations. In other embodiments, after calibration, a user may select (via user control 50 or user device 62) one of these methods to be used for a particular temperature calculation. In yet other embodiments, the controller 42 may use a default one of these methods for all subsequent temperature calculations, while in other embodiments, the controller 42 may iteratively use one or more of these methods while continuously monitoring one or more active cooktop burners. In still other embodiments, only one or two of these different methods may be supported by a particular controller.

Further, the determined one or more locations for each cooktop burner, the determined span for each cooktop burner, the determined locations associated with each of the above methods for subsequently calculating a temperature and/or any other data derived from this information (e.g., burner size and/or center location) can be stored in association with a corresponding cooktop burner. A number of cooktop burners can be determined therefrom and stored in association with the particular arrangement of the cooktop burners. In some embodiments, this information may be stored in the memory 46 of the controller 42, while in other embodiments, this information may be stored in a memory of the thermal sensing system 54 or a memory of an external computing device (e.g., the user device 52, a computer, a laptop, a personal digital assistant, etc.).

Additionally, after the thermal imaging system 54 is calibrated, it can be used to calculate a temperature of each burner, and control and/or safety functions can be performed using the calibrated thermal imaging system. For example, the controller 42 can receive, from the calibrated thermal imaging system, an additional thermal scan captured during operation of the surface cooking device. The controller may retrieve the stored one or more locations for each of the cooktop burners, and determine a temperature for each of the cooktop burners according to one of the various methods discussed above. Moreover, the temperature may be determined based identifying data values at each of the locations in an array of data values for the additional thermal scan, while in other embodiments.

In some embodiments, based on the determined temperature value for each of the cooktop burners, the controller can regulate an energy output of a corresponding cooktop burner (e.g., increase the energy output to raise the temperature of the corresponding cooktop burner or decrease the energy output to lower the temperature of the corresponding cooktop burner). In some other embodiments, based on the determined temperature value for each of the cooktop burners and based on detection of a safety event (e.g., boil-dry event, boil-over event), the controller can automatically shut off a corresponding cooktop burner and provide an audible and/or visual alert of the safety event for presentation to a user.

Although the above operations are described as being performed by the processors 44 of the controller 42 that is not meant to be limiting. In some embodiments, the above operations may be performed by processors of an external computing device (e.g., the user device 62, a controller of an additional appliance, etc.), while in other embodiments, the above operations may be performed by processors of the thermal imaging system 54. In addition, calibration of a thermal imaging device, and use of the thermal imaging device to sense temperature, may be performed by different processors in some embodiments.

Figure 4:
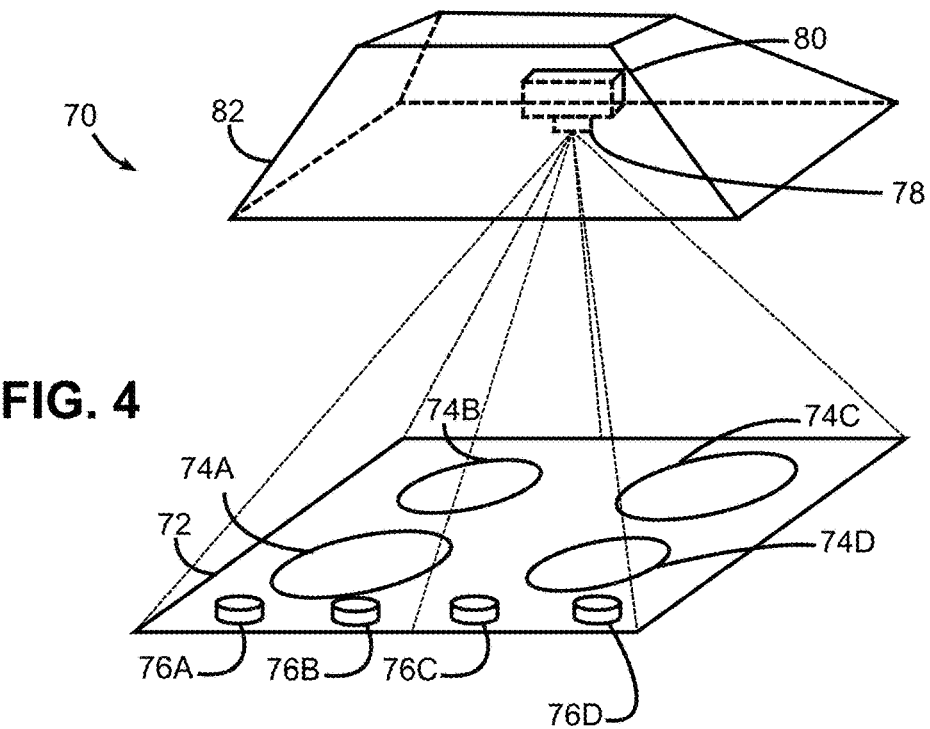
FIG. 4 is a perspective view of another cooking appliance consistent with the invention.

Cooking appliance 8 of FIG. 1 includes each of the aforementioned components, as noted above. However, FIG. 4 illustrates another embodiment of a cooking appliance 70 including a cooktop 72 with a plurality of cooktop burners 74A-74D and corresponding burner controls 76A-76D, as well as a thermal imaging system 78 coupled to a control module 80 disposed in a vent hood 82. Cooking appliance 70, like cooking appliance 8 of FIG. 1, includes cooktop burners, burner controls, and a thermal imaging system; however, cooking appliance 70 also includes a number of variations from cooking appliance 8 to illustrate various different approaches that may be utilized in different embodiments of the invention. For example, rather than being implemented with a cooktop disposed in a range and a thermal imaging system incorporated into an over-the-range oven, cooking appliance 70 includes a standalone or drop-in cooktop 72 and a thermal imaging system 78 mounted on a side of a vent hood 82 or incorporated into the vent hood 82.

In addition, rather than incorporating all control logic within a cooktop or range (e.g., as described in FIG. 2), at least a portion of the control functionality associated with thermal imaging is implemented in cooking appliance 70 using a control module 80 disposed in vent hoot 82. Further, rather than incorporating wired connections between a controller, thermal imaging system, and set of cooktop burner controls, cooking appliance 70 can utilize wireless communication to convey information between cooktop 72 and control module 80, e.g., to provide notifications and/or alerts of status information such as cooktop burner activation states and/or temperatures, burner control positions or settings, etc.

Other variations will be appreciated by those of ordinary skill having the benefit of the instant disclosure. Therefore, the invention is not limited to the particular implementations described herein.

Figure 5:
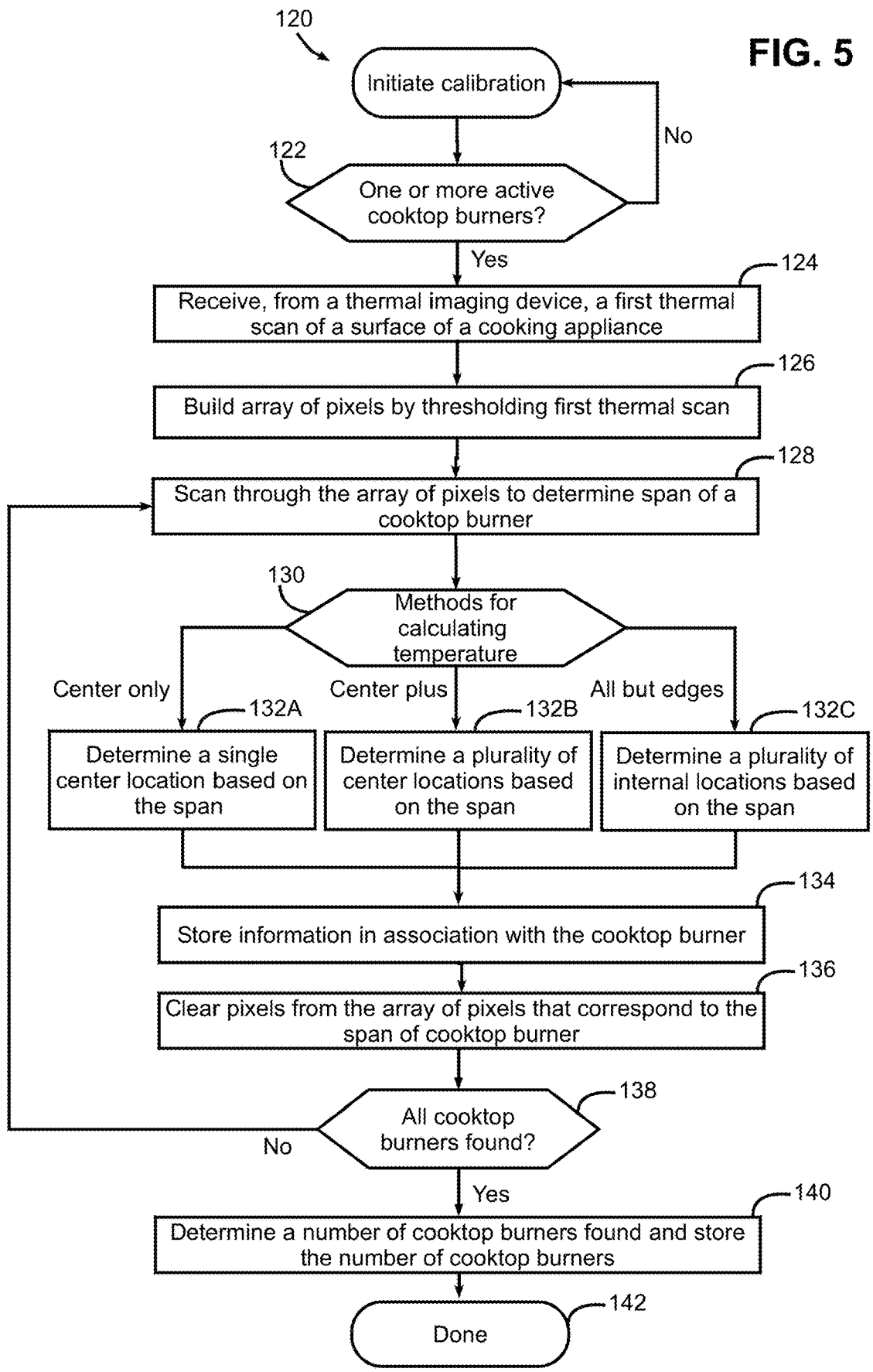
FIG. 5 is a flowchart illustrating an example sequence of operations for calibrating a thermal imaging system for a cooking appliance consistent with the invention.

Now turning to FIG. 5, this figure illustrates an example sequence of operations 120 for calibrating the thermal imaging device for a particular cooktop arrangement in any of the embodiments discussed above in connection with FIGS. 1, 2, and 4. For the sake of simplicity, sequence of operations 123 is discussed as being performed by a controller of a cooking appliance (e.g. controller 42 of FIG. 2), although that should not be limiting. It should be understood that the sequence of operations 120 can be performed locally on the thermal imaging device, or on another device in communication with a cooking appliance and the thermal imaging device (e.g., user device 62 of FIG. 2, control module 80 of FIG. 4, an external computing device, or the like).

Moreover, sequence of operations 120 is specific to a particular arrangement of cooktop burners, so it will be appreciated that different arrangements of cooktop burners may be calibrated using a similar sequence of operation. In some embodiments, multiple iterations of the sequence of operations 120 using multiple thermal scans of a cooktop may be used to calibrate a thermal imaging device, as in some instances it may be desirable to ensure the thermal imaging device is calibrated properly. In other embodiments, multiple iterations of the sequence of operations 120 using a single thermal scans of a cooktop may be used to calibrate a thermal imaging device, as in some instances it may be desirable to ensure the thermal imaging device is calibrated quickly.

Now turning specifically to sequence 120, this sequence for calibrating a thermal imaging device may be initiated. In some embodiments, the thermal imaging device may receive an indication to initiate calibration via a user device, a user control of a surface cooking appliance, or a user control of an additional cooking appliance in communication with the cooking appliance. In other embodiments, the thermal imaging system may initiate calibration after power is connected to the thermal imaging device. At this time, it may also be desirable to instruct a user, e.g., via an audible and/or visual message, of the need to activate all burners in order to perform the calibration (or the burners may be automatically activated in some embodiments), since calibration in the manner described herein involves determining how the heat output by each burner is sensed by the thermal imaging device. At block 122, the controller may determine if the cooktop burners of the surface cooking appliance are currently active, i.e., whether the cooktop burners are an active state and emitting heat, or whether the cooktop burners are in an inactive state. If the cooktop burners are in the inactive state, the controller can monitor the cooktop burners until it is determined the cooktop burners are in the active state. If the cooktop burners are in the active state, control passes to block 124.

At block 124, the controller may receive, from a thermal imaging device via an array of thermal sensors, a first thermal scan of a surface of a cooking appliance. The thermal scan includes a plurality of data values, and each of the data values are associated with a temperature at an associated location in the field of view of the device. In some embodiments, and as illustrated in block 126, the data values may be used to generate a two-dimensional array of pixels for further processing (as discussed in connection with FIGS. 2 and 3), while in other embodiments, the data values may be processed without generating the two-dimensional array of pixels.

Specifically, in block 126, the controller generates a two dimensional array of pixels, with each pixel corresponding to a location in the thermal scan. Then, the data values of the thermal scan are each compared to a threshold, and each pixel corresponding to a location in the thermal scan having an associated data value that exceeds the threshold is assigned a value of "1" and each pixel corresponding to a location in the thermal scan having an associated data value that does not exceed the threshold is assigned a value of "0".

Next, at block 128, the controller may determine a span of the cooktop burner by scanning through the array of pixels. The span in this embodiment can include first and second dimensions and can be determined based on scanning the two-dimensional array of pixels to identify left-most and right-most x-values, and top-most and bottom-most y-values, bounding the burner.

At block 130, the controller may determine locations within the span of the cooktop burner to be used for calculating a temperature of the cooktop burner after calibration is complete according to one or more various methods (e.g., "center only", "center plus", "all but edges"). In some embodiments, the controller may calculate the temperature for the cooktop burner as an average temperature across the determined locations. In some embodiments, the controller determines locations for each of these methods, while in other embodiments, the controller may use only one or two of these various methods. In still other embodiments, other methods may be used (e.g., averaging all of the locations determined to be within the boundary of a burner, or differently weighting different locations in a temperature calculation). For example, the controller can determine, based on the span of the cooktop burner, a single center location (at block 132A), a plurality of center locations (at block 132B), or a plurality of internal locations (at block 132C). Moreover, during calibration, the controller may receive an indication from a user via a user control of the cooking appliance or a user device in communication with the cooking appliance to calibrate the thermal imaging device using a particular one of these methods. These various methods are identified at illustrated in FIGS. 6A-6C.

Figure 6A:
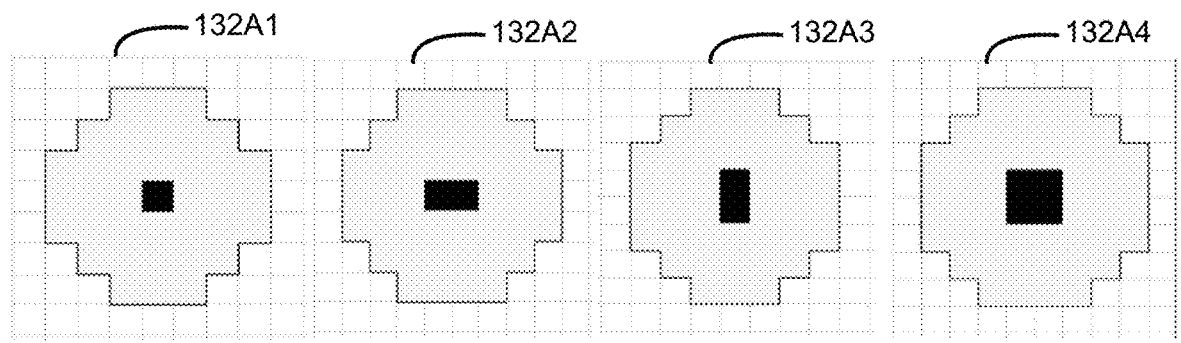
FIG. 6A is a top view of a "center only" method for calculating a temperature for each cooktop burner of a cooking appliance based on a span of each of the cooktop burners consistent with the invention.

In some embodiments, as indicated by block 132A and as illustrated in FIG. 6A, the controller may identify a single center location (i.e., a "center only" method). The single center location can include one or more locations and may be determined based on the span determined at block 128. For example, in 132A1, if there is an odd number of pixel rows and an odd number of pixel columns in the span, then there is the single center location includes only one location as indicated by 132A1. As another example, in 132A2, if there is an odd number of pixel rows but an even number of pixel columns in the span, then the single center location includes two center locations oriented in a horizontal manner as indicated by 132A2. As yet another example, in 132A3, if there is an even number of pixel rows but an odd number of pixel columns in the span, then the single center location includes two center locations oriented in a vertical manner as indicated by 132A3. As yet another example, in 132A4, if there is an even number of pixel rows and an even number of pixel columns in the span, then the single center location includes four center locations oriented in a cubical manner as indicated by 132A4.

Figure 6B:
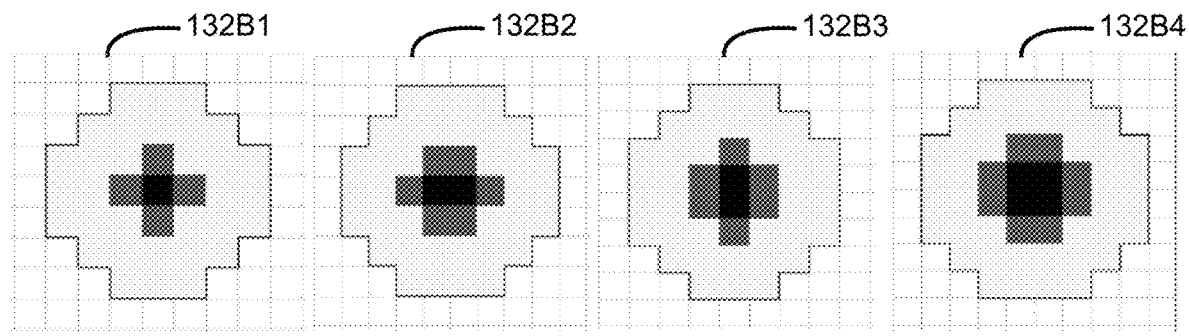
FIG. 6B is a top view of a "center plus" method for calculating a temperature for each cooktop burner of a cooking appliance based on a span of each of the cooktop burners consistent with the invention.

In other embodiments, as indicated by block 132B and as illustrated in FIG. 6B, the controller may identify a plurality of center locations, including the determined single center location (i.e., a "center plus" method). The plurality of center locations can include one or more locations and may be determined based on the span determined at block 128. For example, in 132B1 and in addition to the single center location identified in 132A1, four additional adjacent locations are identified as the plurality of center locations as indicated by 132B1, resulting in five total locations. As another example, in 13262 and in addition to the single center location, including adjacent locations oriented in a horizontal manner as identified in 132A2, six additional locations are identified as the plurality of center locations as indicated by 13262, resulting in eight total locations. As yet another example, in 13263 and in addition to the single center location, including two adjacent center locations oriented in a vertical manner as identified in 132A3, six additional locations are identified as the plurality of center locations as indicated by 13263, resulting in eight total locations. As yet another example, in 13264 and in addition to the single center location, including four center locations oriented in a cubical manner as identified in 132A4, eight additional locations are identified as the plurality of center locations as indicated by 13263, resulting in twelve total locations.

Figure 6C:
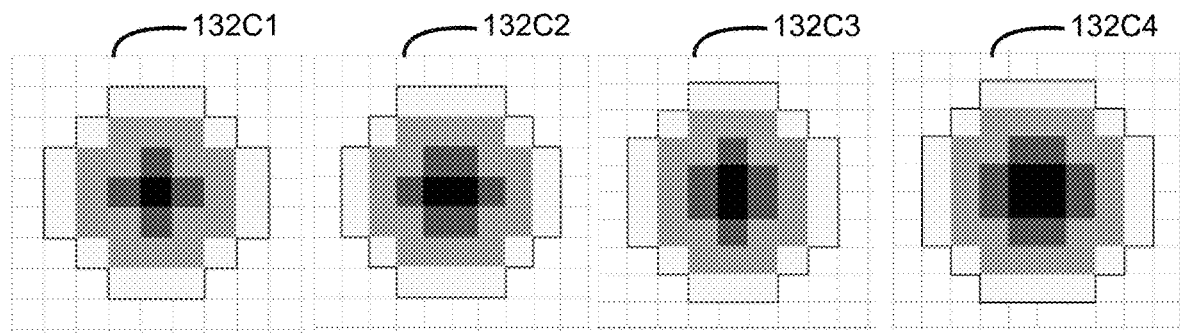
FIG. 6C is a top view of an "all but edges" method for calculating a temperature for each cooktop burner of a cooking appliance based on a span of each of the cooktop burners consistent with the invention.

In yet other embodiments, as indicated by block 132C and as illustrated in FIG. 6C, the controller may identify a plurality of internal locations, including the determined plurality of center locations (i.e., an "all but edges" method). The plurality of internal locations can include one or more locations and may be determined based on the span determined at block 128. Further, the plurality of internal locations include all of the locations of the cooktop burner that do not define a boundary of the cooktop burner. For example, in 132C1, 132C2, 132C3, and 132C4, each of the internal locations for the cooktop burners are indicated as belonging to the determined plurality of the internal locations. For the "all but edges" method, the number of locations depends on the size of each burner.

Moreover, each method can offer various advantages. For example, the "center only" method requires the fewest amount of locations for subsequent temperature calculations as compared to the other methods, thereby conserving computational resources. As another example, the "all but edges" method includes the locations pixels per burner, thereby providing a more accurate average temperature for a particular cooktop burner as a whole. The controller can use the average cooktop burner temperature for each cooktop burner in performing subsequent control and/or safety functions as discussed below in connection with FIG. 7.

Referring back to FIG. 5, at block 134, the controller may store information in association with the cooktop burner. The information stored in association with the cooktop burner includes the one or more locations assigned to the cooktop burner, the determined span of the cooktop burner, the different locations for the cooktop burner and/or additional data such as a size and/or center point for the burner. In some embodiments, the information may be stored in a memory of the controller, while in other embodiments, the information may be stored in a memory of the thermal sensing device or an external computing device (e.g., a user device, a controller of an additional appliance, a computer, a laptop, etc.).

Next, at block 136, the pixels within the span identified for the identified cooktop burner may be cleared in the array such that subsequent scans of the array will not identify any of the pixels corresponding to the identified burner as being "hot". Then, at block 138, the controller determines whether there any additional cooktop burner(s) have yet to be identified. For example, the controller can scan the generated two-dimensional array of pixels (as illustrated in FIG. 3) to determine whether data values at the locations are indicative of an additional cooktop burner(s). As another example, the controller can scan a data value array to determine whether the data values are indicative of an additional cooktop burner(s). If, at an iteration of block 138, the controller determines there is an additional cooktop burner(s), then the controller can return back to block 128 and continue processing the array of pixels in an iterative manner until all cooktop burners are identified. If, at an iteration of block 138, the controller determines there are no more additional cooktop burner(s), then control may then pass to block 140.

At block 140, the controller may determine a total number of identified cooktop burners in a particular arrangement. Further, at block 140, the controller may store the total number of identified cooktop burners in association with the particular arrangement of the cooktop burners. The controller may proceed to block 142 and calibration of the thermal imaging system may finish. At this time, an audible and/or visual message may also be conveyed to the user to instruct the user to deactivate the burners (or the burners may be automatically deactivated in some embodiments).

It will be appreciated that different combinations of calibration schemes may be used in other embodiments, and therefore, the invention is not limited to the particular sequence of operations illustrated in FIG. 5.

Figure 7:
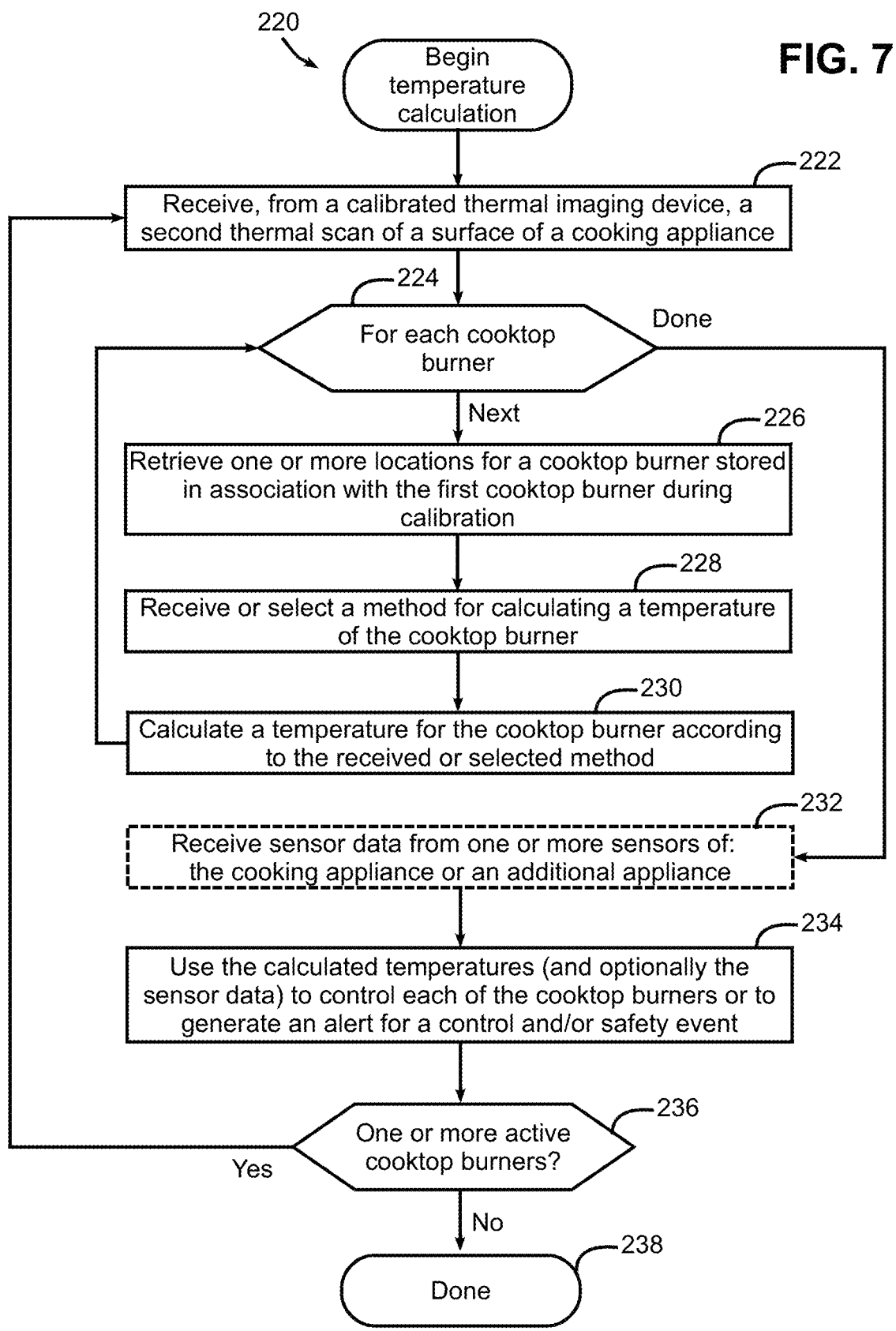
FIG. 7 is a flowchart illustrating an example sequence of operations for using a calibrated thermal imaging system to calculate a temperature for each cooktop burner of a cooking appliance and to perform control and/or safety functions consistent with the invention.

Now turning to FIG. 7 this figure illustrates an example sequence of operations 220 for using the calibrated thermal imaging device for a particular cooktop arrangement, such as the thermal imaging system calibrated in FIG. 5. Sequence of operations 220 is specific to a particular arrangement of cooktop burners, so it will be appreciated that thermal imaging device can be calibrated and used in different arrangements of cooktop burners using similar sequences of operation.

At block 222, the controller may receive, from a calibrated thermal imaging device, a second thermal scan of a surface of a cooking appliance. In some embodiments, upon detecting a cooktop burner transition from an inactive state to an active state, the calibrated thermal imaging device may begin monitoring a surface of a cooking appliance by capturing and processing thermal scans of the surface of the cooking appliance. In some of those embodiments, the calibrated thermal imaging device can begin the monitoring in response to receiving an indication from a user control of the cooking appliance, a user device in communication with the controller. Based on the monitoring, the calibrated thermal sensing device can perform one or more control functions (e.g., increase or decrease energy output of cooking burner), and detect an occurrence of one or more safety events (e.g., boil-over events, boil-dry events).

At block 224, the controller may initiate a FOR loop to determine a temperature for each cooktop burner. For each such burner, block 224 passes control to block 226, where the controller may retrieve one or more locations of a cooktop burner stored in association with the cooktop burner during calibration as discussed in connection with FIG. 5. The one or more locations can be stored in a memory of the controller, a memory of a user device, a memory of a computing device, and/or memory of the calibrated thermal imaging device.

At block 228, the controller may receive, from user controls of the cooking appliance or a user device in communication with the cooking appliance, a method for calculating a temperature of the first cooktop burner. These various methods and determining corresponding locations of the first cooktop burner for calculating the temperature are discussed above in connection with FIGS. 5 and 6A-6C. Alternatively, at block 228, the controller may select a default method to be used for calculating the temperature of the first cooktop burner. Alternatively, the method to use may be implicitly defined by the set of locations stored for the burner, whereby the temperature is calculated simply by averaging together the temperatures sensed by all of the locations stored for the burner. In this latter instance, the method used to calculate temperature is effectively configured during the calibration process, and as such, no method selection may occur during the temperature calculation operation in such an instance. Conversely, where a method is selected during the temperature calculation operation, no method selection may be performed during the calibration process in some embodiments. Each of the corresponding locations of the first cooktop burner associated with each method for calculating the temperature of the first cooktop burner can be retrieved from a memory of a user device, a memory of a computing device, and/or memory of the calibrated thermal imaging device.

At block 230, the controller may calculate the temperature for the cooktop burner. The temperature of the cooktop burner can be calculated according to the received or selected method at block 226, or as noted above, by averaging together all of the stored locations for the burner. For example, if a "center only" method including a single center location for the first cooktop burner is selected either during calibration or during the temperature calculation, then the calculated temperature may be determined based on an average temperature across corresponding single center locations for the first cooktop burner (e.g., average of data values across the one or two locations as indicated in FIG. 6A). As another example, if a "center plus" method including a plurality of center locations for the first cooktop burner is selected either during calibration or during the temperature calculation, then the calculated temperature may be determined based on an average temperature across a corresponding plurality of center locations for the first cooktop burner (i.e., average of data values across the five or eight locations as indicated in FIG. 6B). As yet another example, if an "all but edges" method including a plurality of internal locations for the first cooktop burner is selected either during calibration or during the temperature calculation, then the calculated temperature may be determined based on an average temperature across a corresponding plurality of internal locations for the first cooktop burner (i.e., average of data values across the internal locations as indicated in FIG. 6C).

Moreover, in using the calibrated thermal imaging device to calculate the temperature of the cooktop burner, the controller need not generate a two-dimensional array of pixels to identify the locations for each of the above methods, or analyze each location in a thermal scan. Rather, the controller can receive the second thermal scan of the surface of the cooktop burner captured by the thermal imaging device, retrieve the locations associated for a particular cooktop burner, and compare a data value array corresponding to the second thermal scan to the locations to identify the data values in the data value array for the locations for each of the above methods with respect to the cooktop burner.

After the burner temperature is calculated, control returns to block 224 to process additional burners, and once temperatures are calculated for all burners, block 224 passes control to block 232. As such, in some embodiments, the controller may iteratively calculate a temperature for each of the cooktop burners disposed on the surface of the cooking appliance before performing any subsequent control and/or safety functions based on the calculated temperatures. In other embodiments, the controller may calculate a temperature for one cooktop burner and perform a subsequent control and/or safety function based on the calculated temperature for that cooktop burner before calculating a temperature for any of the remaining cooktop burners.

At block 232, the controller may optionally receive sensor data from one or more sensors of the cooking appliance or an additional cooking appliance in communication with the cooking appliance. The one or more sensors (e.g., sensors 56 of FIG. 2) can sense environmental conditions inside of and/or external to cooking appliance, and can include one or more temperature sensors, humidity sensors, air quality sensors, smoke sensors, carbon monoxide sensors, odor sensors and/or electronic nose sensors, among others. Such sensors may be internal or external to the cooking appliance, and may be coupled to the controller via a wired or wireless connection.

At block 234, the controller can, based on the calculated temperature for each cooktop burner on a surface of the cooking appliance (and optionally the received sensor data), control the cooking appliance and/or generate an alert for an occurrence of a safety event. In some embodiments, based on the calculated temperature, the controller can increase the energy output of a particular cooktop burner to raise the temperature of the particular cooktop burner, while on other embodiments, the controller can decrease the energy output of the particular cooktop burner to lower the temperature of the particular cooktop burner. For example, if a desired temperature is 212° Fahrenheit (e.g., the boiling point for water) when bringing a pot of water to boil for cooking pasta and a current temperature sensed by the thermal imaging sensor is 200° Fahrenheit, then the controller can provide a signal to a cooking element corresponding to the particular burner to increase the energy output of the particular burner, thereby increasing the current average temperature. In this manner, the controller can monitor each of the cooktop burners, and continuously increase and/or decrease an energy output for a cooking element corresponding to a cooktop burner to maintain a desired temperature of the cooktop burner.

Moreover, in some embodiments, based on the calculated temperature (and optionally the received sensor data), the controller can detect an occurrence of a safety event. For example, if a calculated temperature of a first cooktop burner, with a pot of boiling water disposed thereon, is around 212° Fahrenheit at both a first time and a second time (that is subsequent to the first time) but increases to well above 212° Fahrenheit at a third time (i.e., 300° Fahrenheit) that is subsequent to both the first time and the second time, then it may be inferred that a "boil-dry" safety event has occurred based on the rate of change for the calculated temperature from the second time to the third time. In contrast, for example, if a calculated temperature of a first cooktop burner, with a pan of oil disposed thereon, is around 400° Fahrenheit at a first time and a second time, then it may not infer that a "boil-dry" safety event has occurred because the calculated temperature remained relatively constant over time despite being well over the boiling point of water (i.e., 212° Fahrenheit). Accordingly, the controller can monitor calculated temperatures for each cooktop burner over time, and detect the occurrence of the safety event based on how the calculated temperature for each cooktop burner changes over time.

In addition, in some embodiments, safety events associated with locations that are not associated with a particular burner may be identified. For example, if water boils over, one or more locations designated as being outside of the boundary of a burner may sense an increased temperature, and thus may trigger an alert.

Also, at block 234, in response to a control event and/or detection of an occurrence of a safety event, the controller may generate an alert for presentation to a user via a display of the cooking appliance, a graphical user interface of a user device in communication with the cooking appliance, or an additional computing device in communication with the cooking appliance. The alerts may be provided for audible and/or visual presentation. For example, a speaker of a cooking appliance can provide an audible alert and present an indication of the control event and/or safety event on a display of the cooking appliance. As another example, a speaker of a user device can provide an audible alert and present an indication of the control event and/or safety event on a graphical user interface of the user device.

In some embodiments, the alert can be indicative of a control event. For example, in response to increasing or decreasing an energy output for a cooking element corresponding to a cooktop burner, the controller may generate an alert indicating the increase or decrease of the energy output. As another example, in response to a desired temperature of the cooktop burner being maintained for a threshold amount of time, the controller may generate an alert indicating that a desired temperature for the cooktop burner has been maintained for the threshold amount of time. In some embodiments, the alert can be indicative of an occurrence of a safety event. For example, in response to detecting a boil-dry or boil-over safety event, the controller may automatically shut off a corresponding cooktop burner and generate an alert indicating that a boil-dry or boil-over safety event has occurred and indicating that the corresponding cooktop burner has been automatically shut off based on detection of the boil-dry or boil-over safety event. As another example, in response to detecting a boil-dry or boil-over safety event, the controller may generate an alert indicating that a boil-dry or boil-over safety event has occurred and instructing a user to shut off the corresponding cooktop burner based on detection of the boil-dry or boil-over safety event.

If no control and/or safety event is needed at block 234, then control may pass to block 236 and the controller may determine whether a cooktop burner in the arrangement of cooktop burners is active. If, at an iteration of block 236, there is a cooktop burner active, the controller may return to block 222 and receive an additional thermal scan for subsequent temperature calculations and/or to detect further control events and/or safety events. Accordingly, as long as there is at least one active cooktop burner in the arrangement, the controller can continuously monitor the at least one active cooktop burner. If, at an iteration of block 236, it is determined there are no active cooktop burners, then the controller may proceed to block 238 and cease monitoring the cooktop burners for an occurrence of control and/or safety events.

It will be appreciated that different combinations of calibration schemes may be used in other embodiments, and therefore, the invention is not limited to the particular sequence of operations illustrated in FIG. 7.

As used herein, a "thermal imaging system" (also referred to as a "thermal imaging device") includes an array of thermal sensors, one or more processors, a memory, and one or more network interfaces capable of interfacing with a controller of a cooking appliance or an additional computing system (e.g., a user device, a controller of an additional cooktop in communication with the cooking appliance, a computer, a laptop, etc.). The array of thermal sensors may include an infrared thermal sensor array, a far-infrared thermal sensor array, a long wave infrared thermal sensor array, or any other suitable thermal sensor array capable of detecting infrared waves. Moreover, in some embodiments, a thermal scan of a surface of a cooking appliance may include only an array sensed temperature values for a plurality of locations corresponding to the surface of the cooking appliance, while in other embodiments, the thermal scan include a thermal image and associated sensed temperature values for plurality of pixels in the thermal image.

A field of view of the thermal imaging system may depend on a height from the surface of the cooking appliance to where the thermal imaging system is mounted. Accordingly, a field of view angle for a thermal sensing system can vary to account for different heights from the surface of the cooking appliance to where the thermal imaging system is mounted. Generally, a thermal imaging system with a 110° field of view angle is compatible with most surfaces of cooking appliances, but may not provide as high quality of resolution in some applications as compared to a thermal imaging system with a 55° field of view angle.

Once a thermal imaging system is calibrated consistent with embodiments disclosed herein, the thermal imaging system need not be "re-calibrated", unless an arrangement of cooktop burners changes (i.e., a new cooktop is installed with a different arrangement). However, thermal imaging system can be re-calibrated in response to receiving a signal to initiate re-calibration. The signal to initiate re-calibration can be received via a user control of a cooking appliance or a user device in communication with the cooking appliance. In other words, a thermal imaging system only needs to be calibrated once for a particular arrangement of cooktop burners to be used in performing subsequent control and/or safety functions, but can be re-calibrated for a different arrangement if needed.

Moreover, in performing subsequent control and/or safety functions, there is often a pot or pan place on a particular cooktop burner for cooking applications. The thermal imaging system may use a temperature of the pot, pan, or contents thereof (i.e., temperature of water in a pot on a particular cooktop burner) as a proxy for the temperature of a corresponding cooktop burner. For example, if it is desired to "hold" water or oil at an optimal temperature, then the thermal imaging system can continually monitor a corresponding cooktop burner and continuously adjust the energy output (i.e., increase or decrease the energy output of the cooking element thereby increasing or decreasing a temperature of the cooktop burner) of a cooking element associated with the corresponding cooktop burner to "hold" the water or the oil at the optimal temperature.

Accordingly, this disclosure provides techniques for calibrating a thermal imaging device for a particular cooktop arrangement regardless of a number of cooktop burners included on a surface of a cooking appliance, or the locations of each cooktop burner on the surface of the cooking appliance. Once calibrated, the thermal imaging system enables subsequent control and/or safety functions to be performed. Thus, techniques disclosed herein provide optimal use of a thermal imaging system, or thermal imaging device, in conjunction with the particular arrangement of cooktop burners on the surface of the cooking appliance.

It will be appreciated that various additional modifications may be made to the embodiments discussed herein, and that a number of the concepts disclosed herein may be used in combination with one another or may be used separately. Therefore, the invention lies in the claims hereinafter appended.

What is claimed is:

1. A method, comprising:
 calibrating a thermal imaging device for a surface cooking appliance including a plurality of cooktop burners, wherein calibrating the thermal imaging device includes:
 receiving, by one or more processors and from the thermal imaging device, a first thermal scan of the surface cooking appliance captured while the plurality of cooktop burners are active, the first thermal scan including a plurality of data values, each of the data values associated with a temperature at an associated location among a plurality of locations in a field of view of the thermal imaging device;
 processing, by one or more of the processors, the plurality of data values of the first thermal scan of the surface cooking appliance to:
 identify each of the plurality of cooktop burners of the surface cooking appliance,
 determine therefrom a number of cooktop burners in the plurality of cooktop burners, and
 determine therefrom one or more locations from among the plurality of locations in the field of view of the thermal imaging device to assign to each cooktop burner; and
 storing, by one or more of the processors, the determined one or more locations for each of the plurality of cooktop burners; and
 after storing the determined one or more locations and after the plurality of cooktop burners are deactivated, calculating a temperature for a first cooktop burner among the plurality of cooktop burners during subsequent operation of the surface cooking appliance, wherein calculating the temperature for the first cooktop burner includes:
 receiving, by one or more of the processors and from the thermal imaging device, a second thermal scan captured during operation of the surface cooking appliance;
 retrieving the stored one or more locations for the first cooktop burner; and
 determining, by one or more of the processors, a temperature for the first cooktop burner using at least one data value from the second thermal scan that is associated with the retrieved one or locations for the first cooktop burner.

2. The method of claim 1, wherein processing the plurality of data values of the first thermal scan of the surface cooking appliance comprises:
generating a two dimensional array of pixels, each pixel in the array of pixels corresponding to a location among the plurality of locations in the field of view of the thermal imaging device and having a value determined based on the data value for the corresponding location, and
scanning the array of pixels to identify each of the cooktop burners of the surface cooking appliance.

3. The method of claim 2, wherein generating the array of pixels comprises marking each pixel in the array of pixels for which the data value in the thermal scan for the corresponding location meets a threshold, and wherein scanning the array of pixels includes scanning through the array of pixels to determine a span for each cooktop burner in each of first and second dimensions based upon which pixels are marked.

4. The method of claim 3, wherein scanning the array of pixels includes:
scanning through the array of pixels to determine a span for a first cooktop burner among the plurality of cooktop burners in each of the first and second dimensions,
thereafter clearing a plurality of pixels corresponding to the first cooktop burner, and
thereafter scanning through the array of pixels to determine a span for a second cooktop burner among the plurality of cooktop burners in each of the first and second dimensions.

5. The method of claim 3, wherein determining one or more locations from among the plurality of locations in the field of view of the thermal imaging device to assign to each cooktop burner includes, for a first cooktop burner among the plurality of cooktop burners, determining a single center location to assign to the first cooktop burner using the determined spans for the first cooktop burner in the first and second dimensions.

6. The method of claim 3, wherein determining one or more locations from among the plurality of locations in the field of view of the thermal imaging device to assign to each cooktop burner includes, for a first cooktop burner among the plurality of cooktop burners, determining a plurality of center locations to assign to the first cooktop burner using the determined spans for the first cooktop burner in the first and second dimensions.

7. The method of claim 3, wherein determining one or more locations from among the plurality of locations in the field of view of the thermal imaging device to assign to each cooktop burner includes, for a first cooktop burner among the plurality of cooktop burners, determining a plurality of internal locations to assign to the first cooktop burner using the determined spans for the first cooktop burner in the first and second dimensions.

8. The method of claim 1, wherein determining the temperature for the first cooktop burner comprises determining the temperature using a single center location for the first cooktop burner.

9. The method of claim 1, wherein determining the temperature for the first cooktop burner comprises determining the temperature using a plurality of center locations for the first cooktop burner.

10. The method of claim 1, wherein determining the temperature for the first cooktop burner comprises determining the temperature using a plurality of internal locations for the first cooktop burner.

11. The method of claim 1, further comprising:
regulating an energy output of the first cooktop burner based upon the determined temperature for the first cooktop burner.

12. The method of claim 1, further comprising:
detecting an occurrence of a safety event for the first cooktop burner based upon the determined temperature for the first cooktop burner; and
subsequent to detecting the occurrence of the safety event, automatically turning off the first cooktop burner and/or providing an audible and/or visual alert of the safety event.

13. The method of claim 12, wherein the safety event is a boil-dry event or a boil-over event.

14. The method of claim 1, further comprising:
prior to receiving the first thermal scan of the surface cooking appliance from the thermal imaging device:
receiving, by one or more of the processors, an indication to initiate calibration of the thermal imaging device, wherein the indication to initiate calibration of the thermal imaging device is received from at least one of:
a user device via one or more networks,
a user control of the surface cooking appliance,
a user control of an additional cooking appliance in communication with the surface cooking appliance, or
the thermal imaging device upon installation.

15. The method of claim 1, wherein the thermal imaging device is mounted above the surface cooking appliance, and wherein the surface cooking appliance is in the field of view of the thermal imaging device.

16. The method of claim 1, wherein calibrating the thermal imaging device further includes:
prior to receiving the first thermal scan of the surface cooking appliance, automatically activating all of the plurality of cooktop burners; and
after determining the one or more locations for each of the plurality of cooktop burners, automatically deactivating all of the plurality of cooktop burners.

17. The method of claim 1, wherein calibrating the thermal imaging device further includes:
prior to receiving the first thermal scan of the surface cooking appliance, instructing a user to activate all of the plurality of cooktop burners; and
after determining the one or more locations for each of the plurality of cooktop burners, instructing the user to deactivate all of the plurality of cooktop burners.

18. The method of claim 1, further comprising, after determining the temperature for the first cooktop burner using the at least one data value from the second thermal scan that is associated with the retrieved one or locations for the first cooktop burner, determining that the first cooktop burner is inactive from the determined temperature.

19. A system, comprising:
one or more processors; and
a non-transitory memory storing instructions that, when executed, the instructions cause one or more of the processors to:
calibrate a thermal imaging device for a surface cooking appliance including a plurality of cooktop burners, wherein the instructions that cause one or more of the processors to calibrate the thermal imaging device are configured to:
receive, from the thermal imaging device, a first thermal scan of the surface cooking appliance captured while the plurality of cooktop burners are active, the first thermal scan including a plurality of data values, each of the data values associated with a temperature at an associated location among a plurality of locations in a field of view of the thermal imaging device;
process the plurality of data values of the first thermal scan of the surface cooking appliance to:
identify each of the plurality of cooktop burners of the surface cooking appliance,
determine therefrom a number of cooktop burners in the plurality of cooktop burners, and
determine therefrom one or more locations from among the plurality of locations in the field of view of the thermal imaging device to assign to each cooktop burner; and
store the determined one or more locations for each of the plurality of cooktop burners; and
after storing the determined one or more locations and after the plurality of cooktop burners are deactivated, calculate a temperature for a first cooktop burner among the plurality of cooktop burners during subsequent operation of the surface cooking appliance, wherein the instructions that cause one or more of the processors to calculate the temperature for the first cooktop burner are configured to:
receive, from the thermal imaging device, a second thermal scan captured during operation of the surface cooking appliance;
retrieve the stored one or more locations for the first cooktop burner; and
determine a temperature for the first cooktop burner using at least one data value from the second thermal scan that is associated with the retrieved one or locations for the first cooktop burner.

20. The system of claim 19, wherein the surface cooking appliance is in the field of view of the thermal imaging device, and wherein the thermal imaging device is one of:
incorporated into a housing of an over-the-range oven disposed above the surface cooking appliance;
mounted to an underside of the housing of the over-the-range oven disposed above the surface cooking appliance;
mounted to an underside of an additional cooking appliance disposed above the surface cooking appliance; or
mounted to a side of a vent hood disposed above the surface cooking appliance.

21. The system of claim 19, wherein the instructions are executed by the one or more processors of:
a controller of the surface cooking appliance in communication with the thermal imaging device;
the thermal imaging device in communication with the surface cooking appliance;
a user device in communication with both the thermal imaging device and the surface cooking appliance; or
an additional computing device in communication with both the thermal imaging device and the surface cooking appliance.

22. The system of claim 19, wherein the thermal imaging device includes an array of thermal sensors configured to detect at least one of: infrared waves, far infrared waves, and long wave infrared.

* * * * *